United States Patent
Yamamoto et al.

(10) Patent No.: US 9,973,922 B1
(45) Date of Patent: May 15, 2018

(54) USER IDENTIFICATION FROM USER DATA ASSOCIATED WITH A MOBILE COMMUNICATION DEVICE

(71) Applicant: Honda Motor Co., Ltd., Tokyo (JP)

(72) Inventors: Stuart Masakazu Yamamoto, La Mirada, CA (US); Evan Sullivan, Culver City, CA (US); Junlei Zhang, Long Beach, CA (US); Joseph Anthony Alequin, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/467,795

(22) Filed: Mar. 23, 2017

(51) Int. Cl.
*H04W 4/00* (2018.01)
*H04W 8/20* (2009.01)
*H04L 29/08* (2006.01)
*B60R 16/037* (2006.01)
*G06F 17/30* (2006.01)

(52) U.S. Cl.
CPC .......... *H04W 8/205* (2013.01); *B60R 16/037* (2013.01); *G06F 17/30657* (2013.01); *G06F 17/30702* (2013.01); *H04L 67/12* (2013.01); *H04L 67/306* (2013.01); *H04W 4/008* (2013.01)

(58) Field of Classification Search
CPC .. B60R 16/037; B60W 40/08; B60W 2540/28
See application file for complete search history.

(56) References Cited

U.S. PATENT DOCUMENTS

| | | | |
|---|---|---|---|
| 9,758,116 B2 * | 9/2017 | Xiong | B60R 16/037 |
| 2007/0238491 A1 * | 10/2007 | He | G01C 21/26 455/569.2 |
| 2011/0063103 A1 | 3/2011 | Lee et al. | |
| 2011/0246490 A1 | 10/2011 | Jonsson | |
| 2012/0178369 A1 | 7/2012 | Kim | |
| 2012/0303178 A1 * | 11/2012 | Hendry | B60R 16/037 701/2 |
| 2013/0080149 A1 | 3/2013 | McCombs et al. | |

(Continued)

FOREIGN PATENT DOCUMENTS

| | | |
|---|---|---|
| CN | 102299729 A | 12/2011 |
| CN | 104486716 A | 4/2015 |

(Continued)

*Primary Examiner* — Dung Hong
(74) *Attorney, Agent, or Firm* — Honda Patents & Technologies North America, LLC; Mark E. Duell (57) ABSTRACT

A computer system for establishing a user profile in an in-vehicle communications system based upon a mobile communication device in a motor vehicle includes a processor and a non-transitory computer readable medium. The computer readable medium includes computer program code for retrieving user data from the mobile communication device, the user data including data associated with a particular user of the mobile communication device, parsing a user name from the user data by identifying possessive indicia in the user data and selecting the user name associated with the possessive indicia, transmitting the parsed user name for confirmation from the user, generating the user profile including the user name, storing the user profile in the non-transitory computer medium, and storing at least one user setting associated with the motor vehicle in the user profile.

18 Claims, 4 Drawing Sheets

(56) References Cited

U.S. PATENT DOCUMENTS

| | | | | |
|---|---|---|---|---|
| 2013/0166106 A1* | 6/2013 | Nakagawa | ............ | B60R 16/037 |
| | | | | 701/2 |
| 2014/0066049 A1* | 3/2014 | Cho | ................... | B60W 50/085 |
| | | | | 455/420 |
| 2014/0378063 A1* | 12/2014 | Nathwani | ............. | H04W 4/008 |
| | | | | 455/41.3 |
| 2015/0057839 A1* | 2/2015 | Chang | ................... | B60R 16/037 |
| | | | | 701/2 |
| 2015/0081175 A1* | 3/2015 | Fear | ..................... | H04W 4/008 |
| | | | | 701/49 |
| 2015/0088337 A1* | 3/2015 | Toohy | .................. | B60R 16/037 |
| | | | | 701/1 |
| 2016/0173568 A1* | 6/2016 | Penilla | .................... | G06F 17/00 |
| | | | | 709/217 |
| 2017/0080949 A1* | 3/2017 | Sinaguinan | ....... | B60W 50/0098 |
| 2017/0140757 A1* | 5/2017 | Penilla | .................... | G10L 15/22 |
| 2017/0200336 A1* | 7/2017 | Schmidt | ............. | G07C 9/00174 |

FOREIGN PATENT DOCUMENTS

| | | |
|---|---|---|
| CN | 104796546 A | 7/2015 |
| CN | 105517110 A | 4/2016 |
| CN | 104092720 B | 9/2016 |
| WO | 2016/070338 A | 5/2016 |

\* cited by examiner

USER IDENTIFICATION FROM USER DATA ASSOCIATED WITH A MOBILE COMMUNICATION DEVICE

TECHNICAL FIELD

The embodiments described herein are related to the field of identifying a user by parsing a name from the name of a mobile communication device.

BACKGROUND

As mobile communication devices become more associated with a specific user, and as hand-free units allow for integration of mobile communication devices into the onboard electronics systems of motor vehicles, there is presented a need to be able to identify and associate a mobile communication device with a user. By associating the mobile communication device with a user, a profile may be established on the computing environment of the motor vehicle to identify the user by the presence of the user's mobile communication device. There is further a need to establish such a profile in as a streamlined and user-friendly process as possible.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a computer system for establishing a user profile in an in-vehicle communications system based upon a mobile communication device in a motor vehicle includes a processor and a non-transitory computer readable medium. The computer readable medium includes computer program code for retrieving user data from the mobile communication device, the user data including data associated with a particular user of the mobile communication device, parsing a user name from the user data transmitting the parsed user name for confirmation from the user, and generating the user profile including the user name.

According to another aspect, a method for establishing a user profile in an in-vehicle communications system based upon a mobile communication device in a motor vehicle includes retrieving user data from the mobile communication device, the user data including data associated with a particular user of the mobile communication device, parsing a user name from the user data, transmitting the parsed user name for confirmation from the user, and generating the user profile including the user name.

According to yet another aspect, a computer system for establishing a user profile in an in-vehicle communications system based upon a mobile communication device in a motor vehicle includes a processor and a non-transitory computer readable medium. The computer readable medium includes computer program code for retrieving user data from the mobile communication device, the user data including data associated with a particular user of the mobile communication device, parsing a user name from the user data by identifying possessive indicia in the user data and selecting the user name associated with the possessive indicia, transmitting the parsed user name for confirmation from the user, generating the user profile including the user name, storing the user profile in the non-transitory computer medium, and storing at least one user setting associated with the motor vehicle in the user profile.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

The computing environment described herein parses a user's name from a connected wireless mobile communication device's assigned name. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
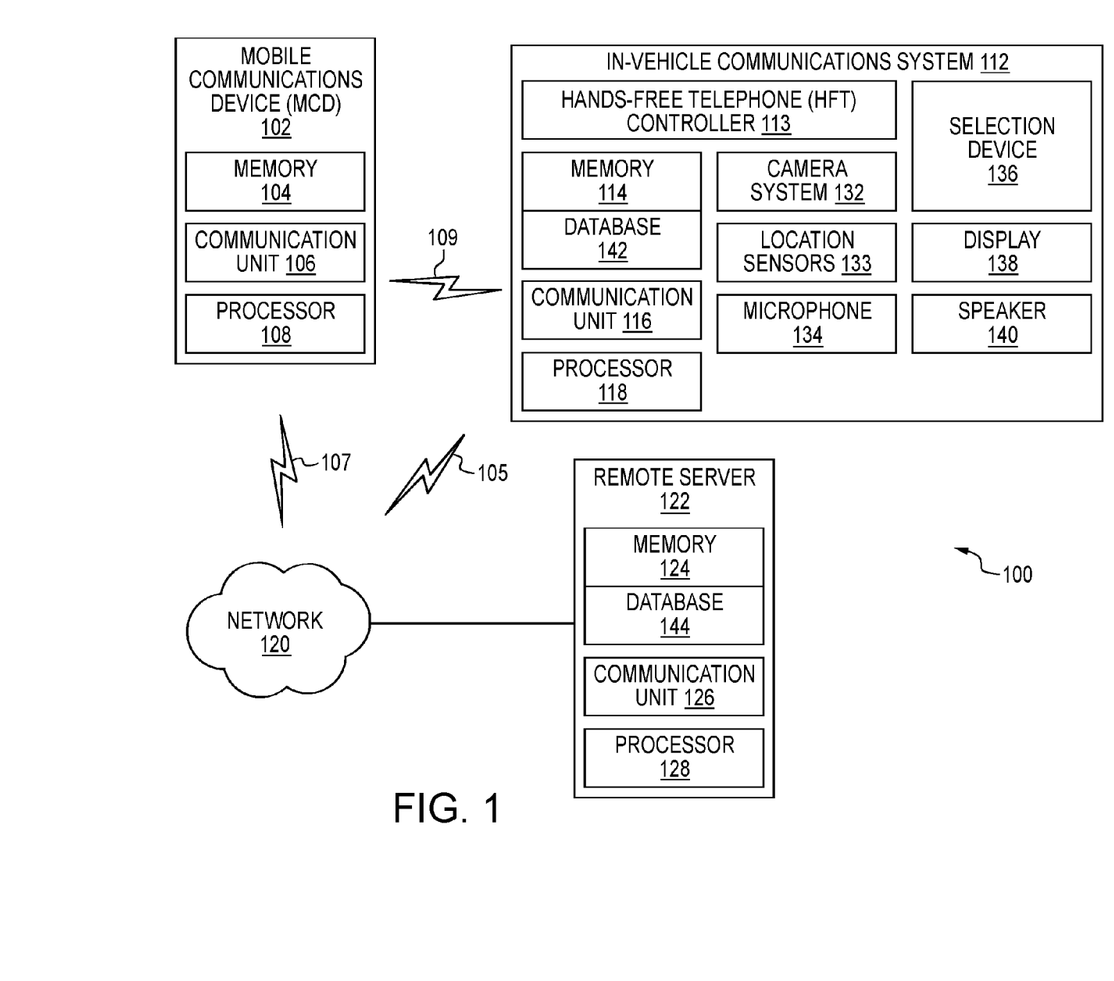
FIG. 1 is block diagram illustrating an exemplary computing environment for establishing a user profile according to one embodiment.

FIG. 1 illustrates an exemplary operating environment 100 for various embodiments. The operating environment 100 may include an in-vehicle communications system 112. One example of such a system is an in-vehicle hands free telephone (HFT) controller 113 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and the wireless mobile communication device 102, a wireless networking communication link 107 between the wireless mobile communication device 102 and the network 120, and a remote server 122 connected to the network 120. The communication links described herein can directly or indirectly connect these devices. The network 120 can be a wireless communication network such as a cellular network made of multiple base stations, controllers, and a core network that typically includes multiple switching entities and gateways, for example.

The functions described herein are set forth as being performed by a device in the operating environment 100 (e.g., the in-vehicle communication system 112, the MCD 102, and/or the remote server 122). These functions can be performed in any of these devices or in any combination of these devices and/or other devices residing in or outside the operating environment 100.

The operating environment 100 includes a memory 114 for storing a user profile related to the MCD 102. The memory 114 may be a computing device with at least a processor and a readable memory configured to store data, or may be a non-transitory computer readable medium storing data for providing a user profile. The user profile may include stored MCD 102 data, such as the user name, data for automatically pairing the MCD 102 with the in-vehicle communications system 112 and user settings for other vehicle systems. These other vehicle systems may include, but are not limited to, settings for seats, in-vehicle audio, climate control, mirrors, and navigation applications.

To provide personalized help for an application (e.g., applications used in a vehicle like a navigation application), the memory 114 integrates user data stored in the user profile into content for the application. An application receives and stores user data for various users. The in-vehicle communications system 112 may store user data for multiple users, but by limiting the usage to user data for a particular user identified by the presence of a particular MCD 102, the applications only use user data that is relevant to a particular user of the application (e.g., data entered into the application by the user) instead of generic data relevant to every user (e.g., a graphic image in a user interface that is displayed with the interface to every user). In one embodiment, data entered or created by a user using the application is user data for a group of users using the application.

In this manner, the memory 114 integrates user data into content. One of the many benefits of generating such content is that the content is likely to resonate with a user because the content includes user data or current location that is more likely to be familiar to the user instead of static data that may be completely irrelevant to the user.

The in-vehicle hands-free telephone (HFT) controller 113 and wireless mobile communication device (MCD) 102 may communicate with each other via a short-range communication link 109 which uses short-range communication technology, such as, for example, Bluetooth® technology, near-field communication (NFC), or other short-range communication technology, for example, Universal Serial Bus (USB). The HFT controller 113 and mobile communications device 102 may connect, or pair, with each other via short-range communication link 109. In an embodiment the vehicle can include a communications unit 116 that interacts with the HFT controller 113 to engage in the short range communications, the memory unit device 114, and a processor 118. The HFT controller 113 can be part of a vehicle's telematics system which includes memory/storage, processor(s) and communication unit(s). The HFT controller 113 can utilize the vehicle's telematics unit to assist in performing various functions. For example, the communications unit 116 and/or processor 118 can be part of the vehicle's telematics unit or can be a separate unit in the vehicle.

The processors 108, 118 and/or 128 process data signals and may include various computing architectures including a complex instruction set computer (CISC) architecture, a reduced instruction set computer (RISC) architecture, or an architecture implementing a combination of instruction sets. Although only a single processor is shown in each device in FIG. 1, multiple processors may be included in each device. The processors can include an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. The MCD 102 includes a communications unit 106, a memory unit device 104, and a processor 108. The MCD 102 also includes an operating system and can include various applications either integrated into the operating system or stored in memory/storage 104 and executed by the processor 108. In a common form, an MCD application can be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from Research In Motion Ltd., Waterloo, Ontario, Canada, and/or applications available for Windows Mobile devices, available from Microsoft Corp., Redmond, Wash.

In alternate embodiments, the mobile communication device 102 can be used in conjunction with a communication device embedded in the vehicle, such as a vehicle-embedded phone, a wireless network card, or other device (e.g., a Wi-Fi capable device). For ease of discussion, the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

The mobile communication device 102 and the in-vehicle system 112 may exchange information via short-range communication link 109. The mobile communication device 102 may store information received from the in-vehicle system 112, and/or may provide the information (such as voice and/or gesture signals) to a remote processing device, such as, for example, the remote server 122, via the network 120. The remote server 122 can include a communications unit 126 to connect to the network 120, a memory/storage unit 124 and a processor 128.

In some embodiments, the in-vehicle system 112 may provide information to the mobile communication device 102. The mobile communication device 102 may use that information to obtain additional information from the network 120 and/or the server 122. The additional information may also be obtained in response to providing information with respect to a prompt on wireless mobile communication device 102 from in-vehicle system 112.

The network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

As illustrated in FIG. 1, the in-vehicle communications system 112 may also include a camera system 132, location sensors 133, and a microphone 134 to be used with other vehicle systems.

Figure 2:
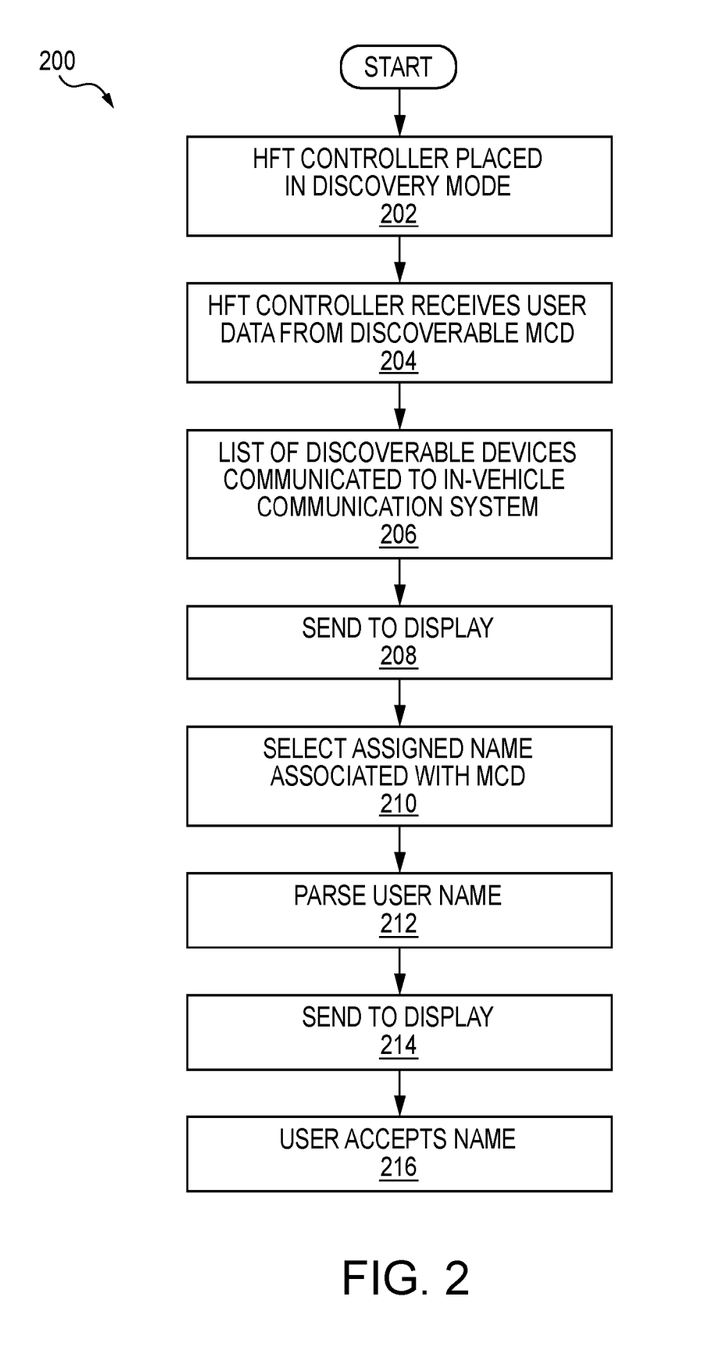
FIG. 2 is flowchart illustrating an exemplary method of establishing a user profile according to one embodiment.

With reference to FIG. 2, a method 200 of establishing the user profile related to an MCD 102 is disclosed. The first time an MCD 102 is to be paired with the HFT controller 113, the HFT controller 113 is placed into a discovery mode as a first step 202 to discover and communicate with any MCD 102 in a discoverable radius via the short-range communication link 109. An MCD 102 is discoverable when the MCD's short-range communication link 109 is active.

In the second step 204, the HFT controller 113 receives, from the discoverable MCD 102, user data associated with the MCD. In particular, the HFT controller 113 receives an assigned name of each discoverable MCD 102. Typically, and as is convention with the makers of most MCD 102, the assigned name is in the format "USER'S DEVICE". In the third step 206, the list of user data related to discoverable MCD's 102 is communicated over an in-vehicle communication link 109 to the in-vehicle communications system 112, which in turn may send the list, in step four 208, over a link, such as a bus, to a display 138 available to a user.

Figure 3:
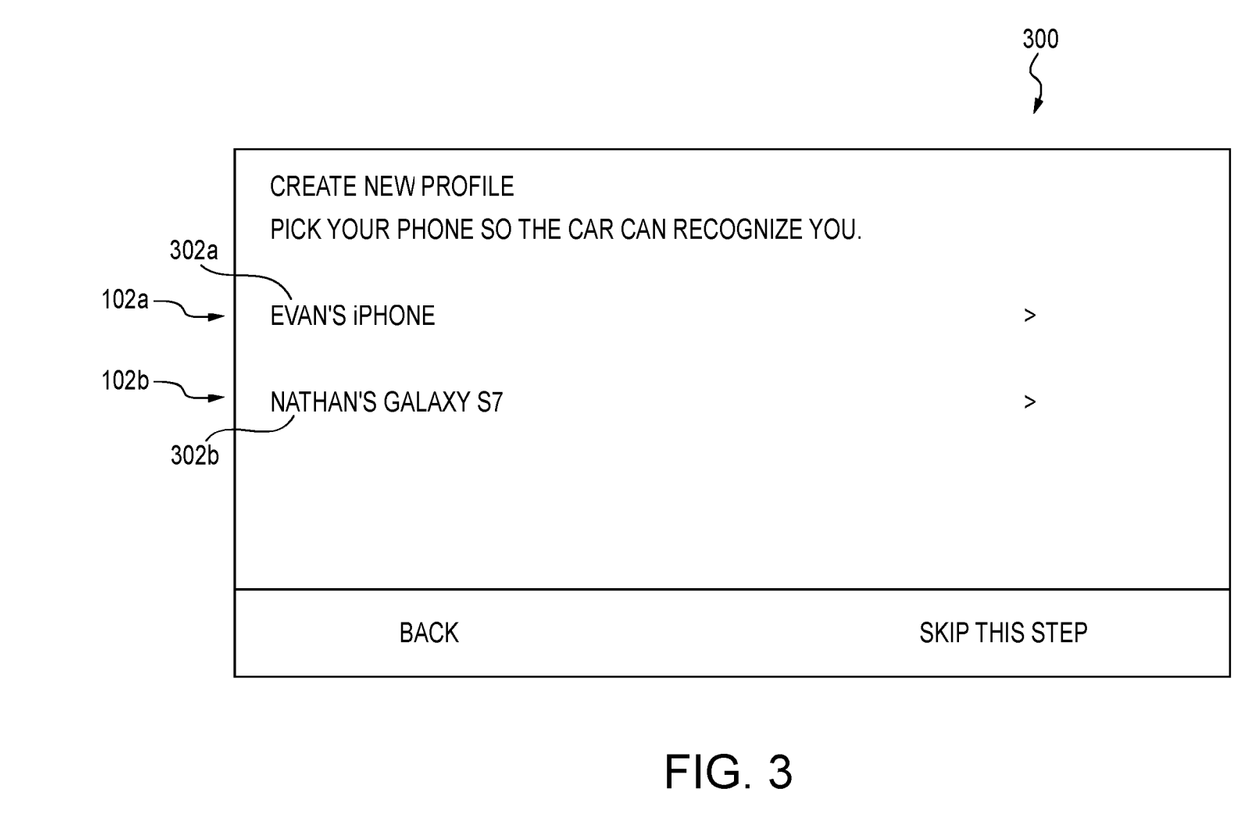
FIG. 3 illustrates an exemplary user interface screen showing a list of discovered mobile communication devices according to one embodiment.

An example of a screen 300 of the display 138 is illustrated in FIG. 3, which, for purposes of illustration and not to limit the embodiment, illustrates two discoverable MCD 102. The first MCD 102a includes an assigned name "Evan's iPhone" 302a. The second MCD 102b includes an assigned name "Nathan's Galaxy S7" 302b.

The display 138 may be an LCD or LED screen in the vehicle. In the event the list contains a plurality of discovered MCD's, the user may use a selection device 136, such as a jog button that controls a cursor visible on the display 138 to select the user selected MCD 102. Contents of the list may also be audibly communicated, by methods known in the art, over a speaker 140 in the vehicle. Continuing with the method described in FIG. 2, a fifth step 210 includes selecting the assigned name associated with the user's MCD 102.

Step six 212 is to parse the user's name from the assigned name of the MCD 102. As previously stated, the typical convention is that the assigned name is in the format of "USER'S DEVICE." In one embodiment, the user's name is selected as the part of the assigned name located before possessive indicia, such as "'s" or "'S", in the assigned name. Once the user's name is parsed, it is transmitted to the display 138, in step seven 214, in a new screen asking for the user's name. For example, if the user selects the second MCD 102b that includes the assigned name "Nathan's Galaxy S7" 302b in FIG. 3, the user's name 402, which is shown in FIG. 4, is parsed as the part before the "'s", which in this exemplary case is "Nathan."

Figure 4:
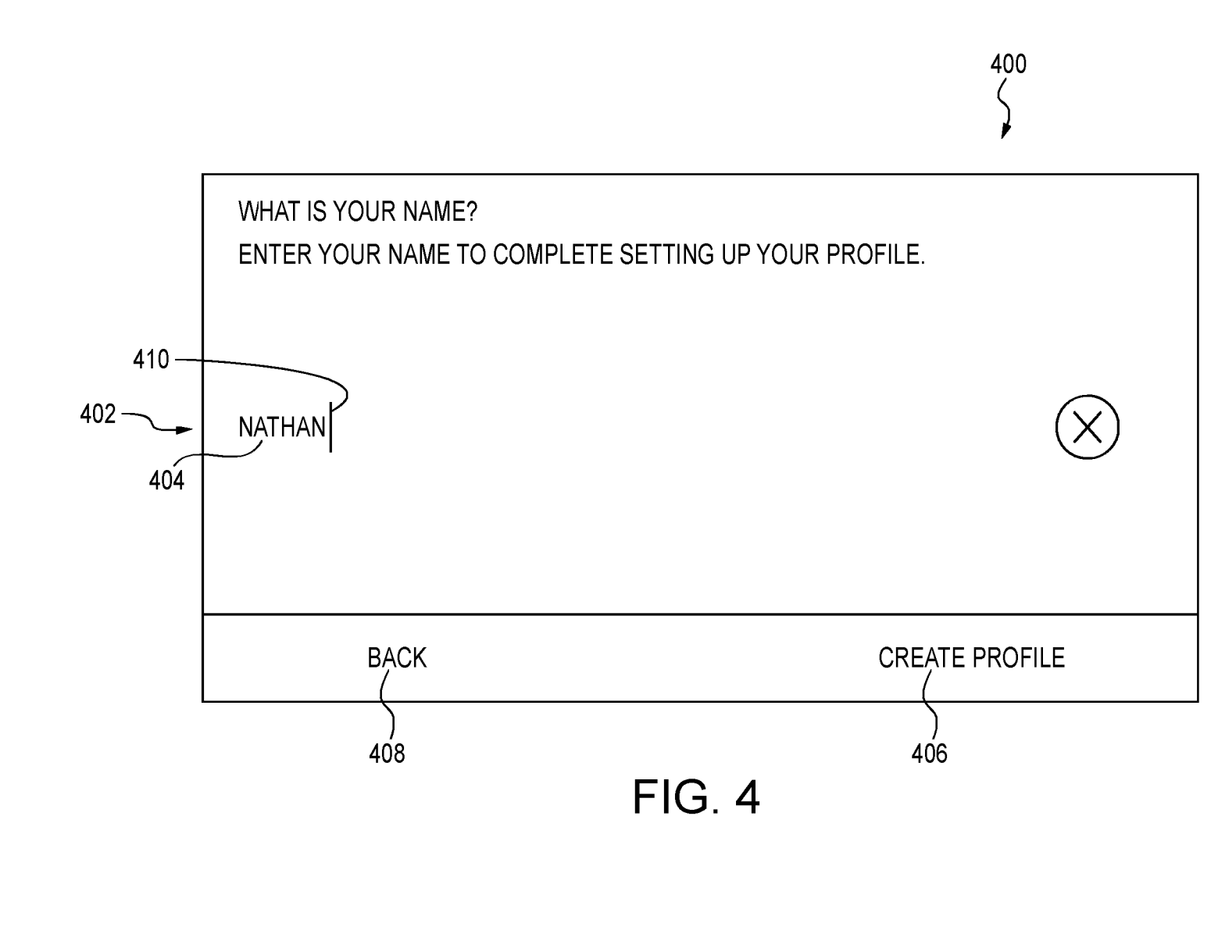
FIG. 4 illustrates an exemplary user interface screen displaying a screen showing a parsed name associated with a mobile communication device according to one embodiment.

FIG. 4 illustrates an embodiment of the screen 400 in the user profile establishment program illustrating the user's name 402 parsed from the prior step. Rather than requiring the user to use the selection device to enter a name, the user's name 402 is pre-populated in the name field 404. The final step eight 216 is to give the user the opportunity to use the selection device 136 to accept the name 402 by selecting the "create profile" button 406, or alternatively correct the name 402 by selecting the back button 408 to reverse the cursor 410 and remove the name 402.

In the embodiment, if the assigned name does not include possessive indicia, no name is parsed and the user profile establishment program asks for the user's name in the screen illustrated in FIG. 4 without pre-populating a name in the name field 404.

In an alternate embodiment, rather than parsing a name by searching for possessive indicia, the assigned name may be compared to a database 142 of known names stored in the memory 114 or as a data request to the remote server 122 to compare with a database 144 of known names stored in the memory 124 of the remote server 122 to identify a user name. A comparison may be made by any known method to those skilled in the art.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer system for establishing a user profile in an in-vehicle communications system based upon a mobile communication device in a motor vehicle, comprising:
   a processor;
   a non-transitory computer readable medium, the computer readable medium including computer program code for:
   retrieving user data from the mobile communication device, the user data including data associated with a particular user of the mobile communication device;
   parsing a user name from the user data, wherein parsing the user name comprises identifying possessive indicia in the user data and selecting the user name associated with the possessive indicia;
   transmitting the parsed user name for confirmation from the user; and
   generating the user profile including the user name.

2. The computer system of claim 1 wherein parsing the user name comprises identifying the user name by comparing user data with a database of names.

3. The computer system of claim 1 wherein the user profile is stored by the non-transitory computer medium.

4. The computer system of claim 3 wherein the user profile is used to store at least one user setting associated with the motor vehicle.

5. The computer system of claim 4 wherein the at least one user setting is associated with a position of a seat in the motor vehicle.

6. The computer system of claim 4 wherein the at least one user setting is associated with a position of a mirror in the motor vehicle.

7. The computer system of claim 4 wherein the at least one user setting is associated with at least one audio setting in the motor vehicle.

8. The computer system of claim 4 wherein the at least one user setting is associated with at least one navigation system setting in the motor vehicle.

9. A method for establishing a user profile in an in-vehicle communications system based upon a mobile communication device in a motor vehicle, comprising the steps of:
   retrieving user data from the mobile communication device, the user data including data associated with a particular user of the mobile communication device;
   parsing a user name from the user data by identifying possessive indicia in the user data and selecting the user name associated with the possessive indicia;
   transmitting the parsed user name for confirmation from the user; and
   generating the user profile including the user name.

10. The method of claim 9 wherein parsing the user name comprises identifying the user name by comparing user data with a database of names.

11. The method of claim 9 wherein the user profile is stored by the non-transitory computer medium.

12. The method of claim 11 wherein the user profile is used to store at least one user setting associated with the motor vehicle.

13. The method of claim 12 wherein the at least one user setting is associated with a position of a seat in the motor vehicle.

14. The method of claim 12 wherein the at least one user setting is associated with a position of a mirror in the motor vehicle.

15. The method of claim 12 wherein the at least one user setting is associated with at least one audio setting in the motor vehicle.

16. The method of claim 12 wherein the at least one user setting is associated with at least one navigation system setting in the motor vehicle.

17. A computer system for establishing a user profile in an in-vehicle communications system based upon a mobile communication device in a motor vehicle, comprising:
   a processor;
   a non-transitory computer readable medium, the computer readable medium including computer program code for:
   retrieving user data from the mobile communication device, the user data including data associated with a particular user of the mobile communication device;
   parsing a user name from the user data by identifying possessive indicia in the user data and selecting the user name associated with the possessive indicia;
   transmitting the parsed user name for confirmation from the user;
   generating the user profile including the user name;
   storing the user profile in the non-transitory computer medium; and
   storing at least one user setting associated with the motor vehicle in the user profile.

18. The computer system of claim 17 wherein the at least one user setting is associated with at least one of a position of a seat in the motor vehicle, a position of a mirror in the motor vehicle, at least one audio setting in the motor vehicle, and at least one navigation system setting in the motor vehicle.

\* \* \* \* \*